United States Patent
Jang

(10) Patent No.: US 12,388,996 B2
(45) Date of Patent: *Aug. 12, 2025

(54) INTRA PREDICTION METHOD AND DEVICE BASED ON INTRA SUB-PARTITIONS IN IMAGE CODING SYSTEM

(71) Applicant: LG Electronics Inc., Seoul (KR)

(72) Inventor: Hyeongmoon Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,396

(22) Filed: Apr. 9, 2024

(65) Prior Publication Data

US 2024/0259562 A1    Aug. 1, 2024

Related U.S. Application Data

(63) Continuation of application No. 17/987,220, filed on Nov. 15, 2022, now Pat. No. 11,985,315, which is a continuation of application No. 17/481,415, filed on Sep. 22, 2021, now Pat. No. 11,575,891, which is a continuation of application No. PCT/KR2019/016883, filed on Dec. 3, 2019.

(60) Provisional application No. 62/822,077, filed on Mar. 22, 2019.

(51) Int. Cl.
| | |
|---|---|
| *H04N 19/105* | (2014.01) |
| *H04N 19/119* | (2014.01) |
| *H04N 19/132* | (2014.01) |
| *H04N 19/159* | (2014.01) |
| *H04N 19/176* | (2014.01) |
| *H04N 19/46* | (2014.01) |

(52) U.S. Cl.
CPC ......... *H04N 19/119* (2014.11); *H04N 19/105* (2014.11); *H04N 19/132* (2014.11); *H04N 19/159* (2014.11); *H04N 19/176* (2014.11); *H04N 19/46* (2014.11)

(58) Field of Classification Search
CPC ..... H04N 19/11; H04N 19/105; H04N 19/159
See application file for complete search history.

(56) References Cited

U.S. PATENT DOCUMENTS

| | | | | |
|---|---|---|---|---|
| 11,159,795 B2* | 10/2021 | Zhao | ................. | H04N 19/44 |
| 11,272,198 B2* | 3/2022 | Zhao | ................. | H04N 19/176 |
| 11,445,189 B2* | 9/2022 | Li | ................. | H04N 19/176 |
| 11,575,891 B2* | 2/2023 | Jang | ................. | H04N 19/70 |

(Continued)

OTHER PUBLICATIONS

Versatile video coding; Chen—Oct. 2018; (Year: 2018).*
Disable ISP mode for 128×N, N×128 blocks; Jang—Mar. 19, 2019; (Year: 2019).*

*Primary Examiner* — Luis Perez-Fuentes
(74) *Attorney, Agent, or Firm* — Fish & Richardson P.C.

(57) ABSTRACT

A method by which a decoding device decodes an image, according to the present document, comprises the steps of: receiving prediction mode information about a current block; receiving intra sub-partitions (ISP)-related information about the current block on the basis of the size and the maximum conversion block size of the current block; deriving an intra prediction mode of the current block on the basis of the prediction mode information; and generating a prediction sample of the current block on the basis of the intra prediction mode and the ISP-related information.

4 Claims, 12 Drawing Sheets

(56) References Cited

U.S. PATENT DOCUMENTS

| | | | |
|---|---|---|---|
| 11,632,543 B2* | 4/2023 | Ko | H04N 19/182 |
| | | | 375/240.02 |
| 11,722,686 B2* | 8/2023 | Zhao | H04N 19/176 |
| | | | 375/240.25 |
| 11,973,945 B2* | 4/2024 | Wang | H04N 19/96 |
| 11,985,315 B2* | 5/2024 | Jang | H04N 19/46 |

* cited by examiner

INTRA PREDICTION METHOD AND DEVICE BASED ON INTRA SUB-PARTITIONS IN IMAGE CODING SYSTEM

CROSS-REFERENCE TO RELATED APPLICATIONS

This application is a continuation of U.S. application Ser. No. 17/987,220, filed on Nov. 15, 2022, which is a continuation of U.S. application Ser. No. 17/481,415, filed on Sep. 22, 2021, now U.S. Pat. No. 11,575,891, which is a continuation pursuant to 35 U.S.C. § 119(e) of International Application PCT/KR2019/016883, with an international filing date of Dec. 3, 2019, which claims the benefit of U.S. Provisional Patent Application No. 62/822,077, filed on Mar. 22, 2019, the contents of which are hereby incorporated by reference herein in their entirety.

BACKGROUND OF DISCLOSURE

Field of the Disclosure

This disclosure relates to image coding technology and, more particularly, to a method and apparatus for an intra sub-partition based intra prediction in in an image coding system.

Related Art

Demands for high-resolution and high-quality images, such as High Definition (HD) images and Ultra High Definition (UHD) images, have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

This document is to provide a method and an apparatus for increasing image coding efficiency.

This document is also to provide an efficient intra prediction method and apparatus.

This document is still also to provide an intra prediction method and apparatus for applying Intra Sub-Partitions (ISP) to a block smaller than or equal to the size of a Virtual Pipeline Data Unit (VPDU).

This document is still also to provide a method and apparatus for applying an ISP in consideration of a decoding pipeline for hardware implementation.

According to an embodiment of this document, an image decoding method performed by a decoding apparatus is provided. The method includes receiving prediction mode information for a current block, receiving intra sub-partition (ISP) related information for the current block based on a size of the current block and a maximum transform block size, deriving an intra prediction mode of the current block based on the prediction mode information, and generating a prediction sample of the current block based on the intra prediction mode and the ISP related information.

According to another embodiment of this disclosure, a decoding apparatus for performing image decoding is provided. The decoding apparatus includes an entropy decoder configure3d to receive prediction mode information for a current block, to receive intra sub-partition (ISP) related information for the current block based on a size of the current block and a maximum transform block size, a predictor configured to derive an intra prediction mode of the current block based on the prediction mode information, and to generate a prediction sample of the current block based on the intra prediction mode and the ISP related information.

According to still another embodiment of this disclosure, an image encoding method performed by an encoding apparatus is provided. The method includes deriving an intra prediction mode of a current block, deriving intra sub-partitions (ISP) related information for the current block based on a size of the current block and a maximum transform block size, generating a prediction sample of the current block based on the intra prediction mode and the ISP related information, generating a residual sample based on the prediction sample, and encoding image information including prediction mode information on the intra prediction mode, the ISP related information and information on the residual sample.

According to still another embodiment of this disclosure, an encoding apparatus for performing image encoding is provided. The encoding apparatus includes a predictor configured to derive an intra prediction mode of a current block, to derive intra sub-partitions (ISP) related information for the current block based on a size of the current block and a maximum transform block size, to generate a prediction sample of the current block based on the intra prediction mode and the ISP related information, a subtractor configured to generate a residual sample based on the prediction sample, and an entropy encoder configured to encode image information including prediction mode information on the intra prediction mode, the ISP related information and information on the residual sample.

According to still another embodiment of this disclosure, a computer-readable storage medium is provided. The computer-readable storage medium stores a bitstream generated by the encoding method.

According to this document, image compression efficiency can be improved.

According to this document, efficient intra prediction can be provided.

According to this document, a problem caused by applying Intra Sub-Partitions (ISP) to a block larger than the Virtual Pipeline Data Unit (VPDU) size can be solved.

According to this document, it is possible to prevent miss-aligned VPDU processing caused by applying ISP to a block larger than the VPDU size.

According to this document, it is possible to provide an ISP in consideration of the decoding pipeline for hardware implementation.

DESCRIPTION OF EMBODIMENTS

Figure 1:
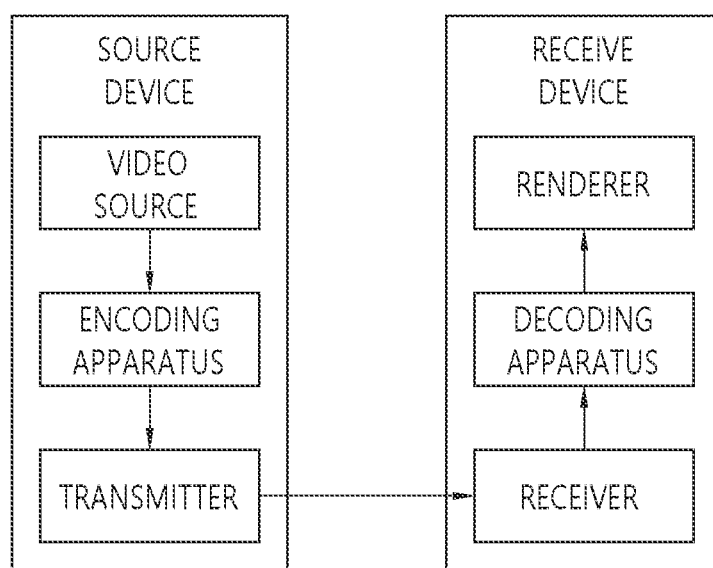
FIG. 1 is schematically illustrating a video/image coding system to which this document may be applied.

This document can be modified in various forms, and specific embodiments thereof will be described and shown in the drawings. However, the embodiments are not intended for limiting this document. The terms used in the following description are used to merely describe specific embodiments, but are not intended to limit this document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each of the components in the drawings described in this document are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this document without departing from the spirit of this document.

Hereinafter, exemplary embodiments of this document will be described in detail with reference to the accompanying drawings. Hereinafter, the same reference numerals are used for the same components in the drawings, and redundant description of the same components may be omitted.

FIG. 1 is schematically illustrating a video/image coding system to which this document may be applied.

Referring to FIG. 1, a video/image coding system may include a first apparatus (a source device) and a second apparatus (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either the number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
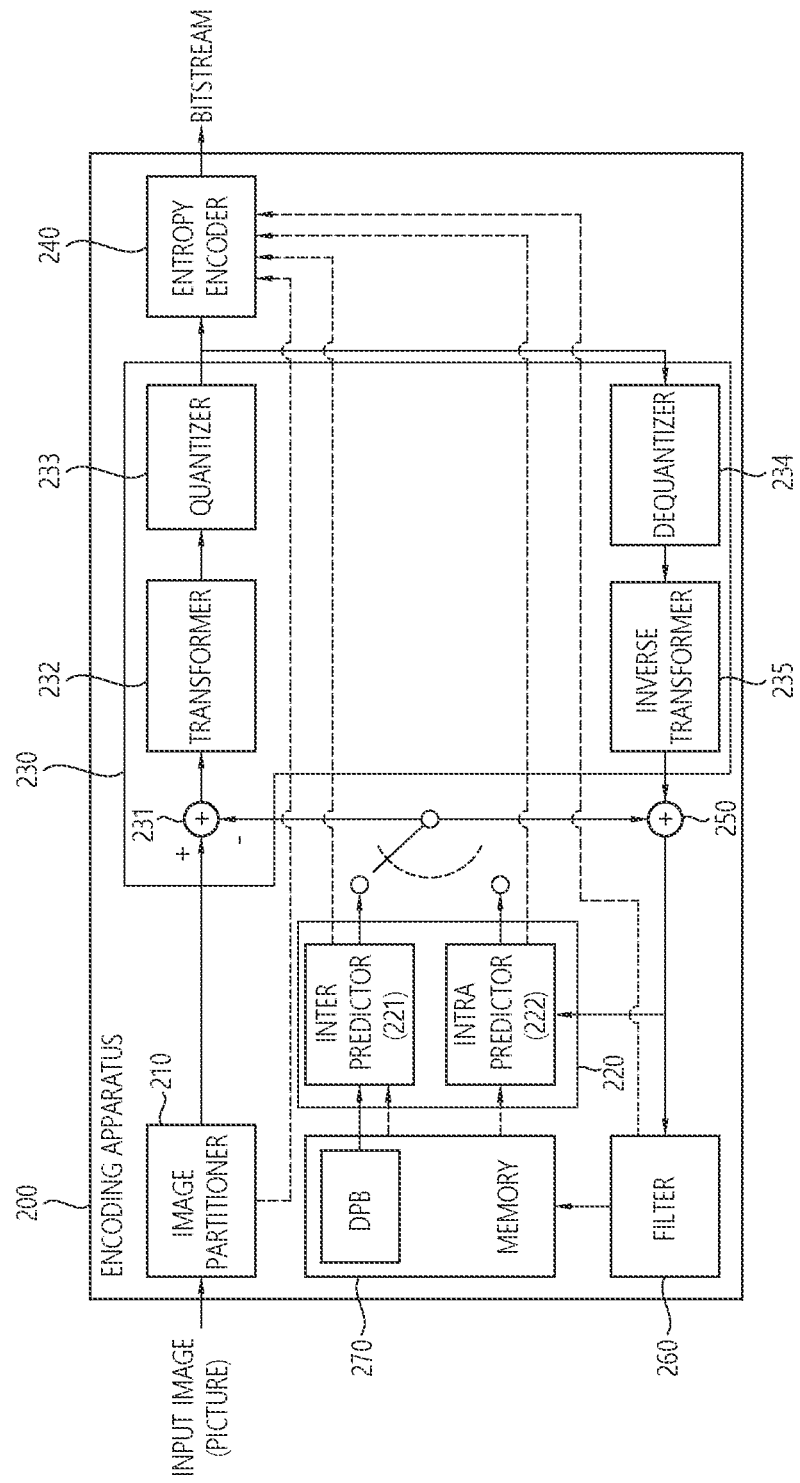
FIG. 2 is a schematic diagram illustrating a configuration of a video/image encoding apparatus to which the present document may be applied.

FIG. 2 is a schematic diagram illustrating a configuration of a video/image encoding apparatus to which the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the embodiments may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal.

For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
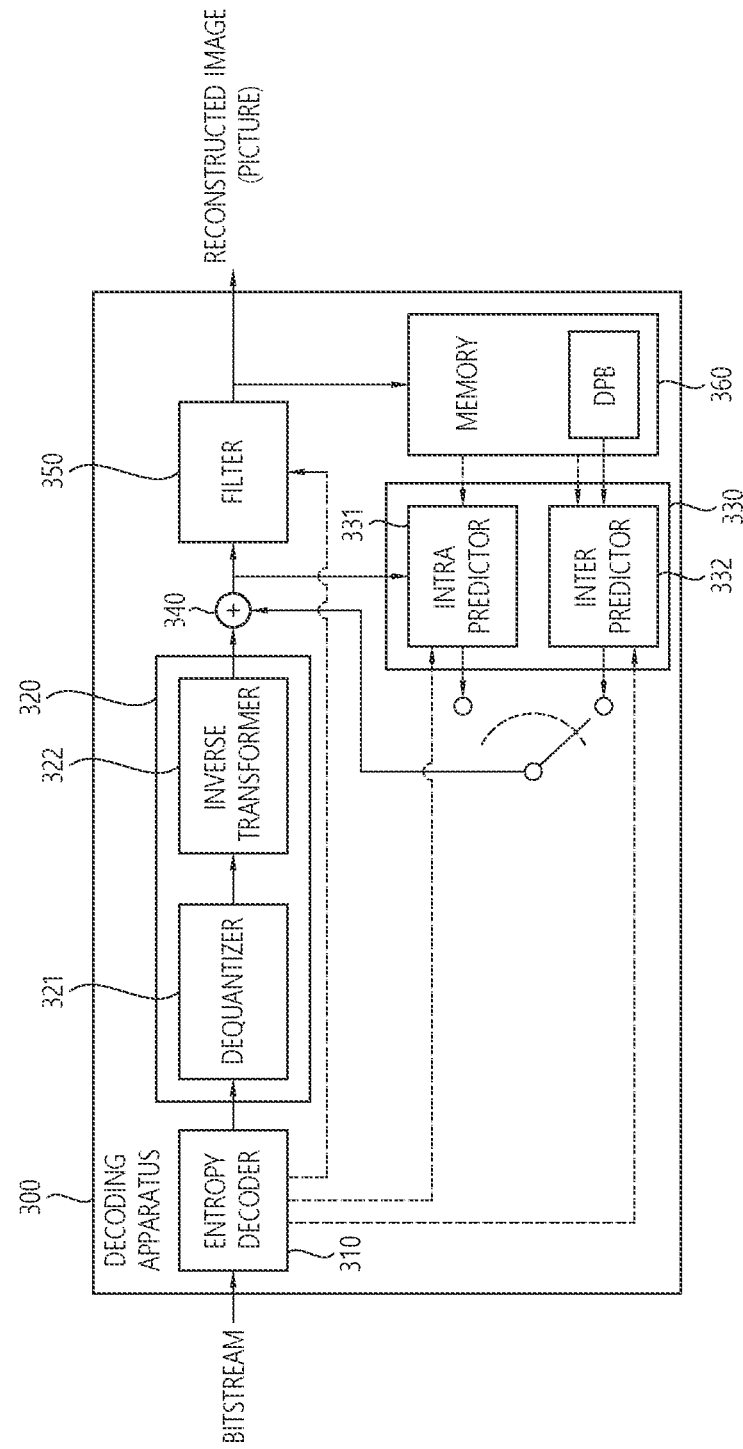
FIG. 3 is a schematic diagram illustrating a configuration of a video/image decoding apparatus to which the present document may be applied.

FIG. 3 is a schematic diagram illustrating a configuration of a video/image decoding apparatus to which the present document may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block. The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Intra prediction may represent prediction generating prediction samples for the current block based on reference samples in a picture (hereinafter, current picture) to which the current block belongs. When the intra prediction is applied to the current block, neighboring reference samples to be used for the intra prediction of the current block may be derived. The neighboring reference samples of the current block may include a sample adjacent to a left boundary of the current block having a size of nW×nH, total 2×nH samples neighboring the bottom-left, a sample adjacent to a top boundary of the current block, total 2×nW samples neighboring the top-right, and one sample neighboring the top-left of the current block. Further, the neighboring reference samples of the current block may also include top neighboring samples of a plurality of columns and left neighboring samples of a plurality of rows. Further, the neighboring reference samples of the current block may also include total nH samples adjacent to the right boundary of the current block having the size of nW×nH, total nW samples adjacent to a bottom boundary of the current block, and one sample neighboring the bottom-right of the current block.

However, some of the neighboring reference samples of the current block may have not yet been decoded or may be unavailable. In this case, the decoder may configure the neighboring reference samples to be used for the prediction by substituting available samples for unavailable samples. Further, the decoder may configure the neighboring reference samples to be used for the prediction through interpolation of the available samples.

When the neighboring reference samples are derived, (i) a prediction sample may be induced based on an average or interpolation of the neighboring reference samples of the current block, and (ii) the prediction sample may be induced based on the reference sample existing in a specific (prediction) direction with respect to the prediction sample among the neighboring reference samples of the current block. The case (i) may be called a non-directional mode or a non-angular mode, and the case (ii) may be called a directional mode or an angular mode.

Further, the prediction sample may be generated through interpolation between a first neighboring sample located in a prediction direction of the intra prediction mode of the current block and a second neighboring sample located in an opposite direction to the prediction direction among the neighboring reference samples. The above-described case may be called a linear interpolation intra prediction (LIP). Further, chroma prediction samples may be generated based on luma samples using a linear model. This case may be called an LM mode.

Further, a temporary prediction sample of the current block may be derived based on the filtered neighboring reference samples, and the prediction sample of the current block may be derived by weighted-summing the at least one reference sample derived according to the intra prediction mode among the existing neighboring reference samples, that is, non-filtered neighboring reference samples, and the temporary prediction sample. The above-described case may be called a position dependent intra prediction (PDPC).

Further, a reference sample line having the highest prediction accuracy among neighboring multiple reference sample lines of the current block may be selected, and the prediction sample may be derived from the corresponding line using the reference sample located in the prediction direction. In this case, an intra prediction encoding may be performed as a method for indicating (signaling) the used reference sample line to the decoding apparatus. The above-described case may be called a multi-reference line (MRL) intra prediction or MRL based intra prediction.

Further, the intra prediction may be performed based on the same intra prediction mode by dividing the current block into vertical or horizontal sub-partitions, and the neighboring reference samples may be derived and used in the unit of sub-partition. That is, in this case, the intra prediction mode for the current block is equally applied to the sub-partitions, and the neighboring reference sample is derived and used in the unit of the sub-partition, thereby enhancing the intra prediction performance as needed. Such a prediction method may be called an intra sub-partitions (ISP) or ISP based intra prediction.

The above-described intra prediction methods may be called an intra prediction type to be distinguished from the intra prediction mode. The intra prediction type may be referred to by various terms such as an intra prediction technique or an additional intra prediction mode. For example, the intra prediction type (or additional intra prediction mode, etc.) may include at least one of the aforementioned LIP, PDPC, MRL, and ISP. A general intra prediction method excluding a specific intra prediction type such as LIP, PDPC, MRL, and ISP may be referred to as a normal intra prediction type. The normal intra prediction type may be generally applied when the above specific intra prediction type is not applied, and prediction may be performed based on the above-described intra prediction mode. The information on the intra prediction type may be encoded by an encoding apparatus and included in a bitstream to be signaled to a decoding apparatus. The information on the intra prediction type may be implemented in various forms, such as flag information indicating whether each intra prediction type is applied or index information indicating one of several intra prediction types. Meanwhile, if necessary, post-processing filtering may be performed on the derived prediction sample.

Specifically, the intra prediction procedure may include an intra prediction mode/type determination step, a neighboring reference sample derivation step, and an intra prediction mode/type based prediction sample derivation step. In addition, a post-filtering step may be performed on the derived prediction sample as needed.

The most probable mode (MPM) list for deriving the above-described intra prediction mode may be configured differently according to the intra prediction type. Alternatively, the MPM list may be configured in common regardless of the intra prediction type.

In case that intra prediction is applied, the intra prediction mode that is applied to the current block may be determined using the intra prediction mode of a neighboring block. For example, the decoding apparatus may select one of MPM candidates in the MPM list, which is derived based on the intra prediction mode of the neighboring blocks (e.g., left and/or top neighboring blocks) of the current block and additional candidate modes, based on the received MPM index, or may select one of the remaining intra prediction modes that are not included in the MPM candidates (and planar mode) based on the remaining intra prediction mode information. The MPM list may be configured to include or not to include the planar mode as the candidate. For example, if the MPM list includes the planar mode as the candidate, the MPM list may have 6 candidates, whereas if the MPM list does not include the planar mode as the candidate, the MPM list may have 5 candidates. If the MPM list does not include the planar mode as the candidate, a not planar flag (e.g., intra_luma_not_planar_flag) indicating whether the intra prediction mode of the current block is not the planar mode may be signaled. For example, the MPM flag may be first signaled, and the MPM index and the not planar flag may be signaled in case that a value of the MPM flag is 1. Further, the MPM index may be signaled in case that a value of the not planar flag is 1. Here, the reason that the MPM list is configured not to include the planar mode as the candidate is to first check the planar mode by first signaling the flag (not planar flag) since the planar mode is always considered as the MPM rather than that the planar mode is not the MPM.

For example, whether the intra prediction mode being applied to the current block is in the MPM candidates (and planar mode) or in the remaining mode may be indicated based on the MPM flag (e.g., intra_luma_mpm_flag). The MPM flag value 1 may represent that the intra prediction mode for the current block is in the MPM candidates (and planar mode), and the MPM flag value 0 may represent that that the intra prediction mode for the current block is not in the MPM candidates (and planar mode). The not planar flag (e.g., intra_luma_not_planar_flag) value 0 may represent that the intra prediction mode for the current block is the planar mode, and the not planar flag value 1 may represent that the intra prediction mode for the current block is not the planar mode. The MPM index may be signaled in the form of mpm_idx or intra_luma_mpm_idx syntax element, and the remaining intra prediction mode information may be signaled in the form of rem_intra_luma_pred_mode or intra_luma_mpm_remainder syntax element. For example, the remaining intra prediction mode information may indicate one of the remaining intra prediction modes which are not included in the MPM candidates (and planar mode) among all the intra prediction modes by indexing the remaining intra prediction modes in the order of prediction mode numbers. The intra prediction mode may be an intra prediction mode for a luma component (sample). Hereinafter, the intra prediction mode information may include at least one of the MPM flag (e.g., intra_luma_mpm_flag), the not planar flag (e.g., intra_luma_not_planar_flag), the MPM index (e.g., mpm_idx or intra_luma_mpm_idx), or the remaining intra prediction mode information (rem_intra_luma_pred_mode or intra_luma_mpm_remainder). In the document, the MPM list may be called as various wordings, such as MPM candidate list, candModeList, and the like. If the MIP is applied to the current block, separate mpm flag (e.g., intra_mip_mpm_flag), mpm index (e.g., intra_mip_mpm_idx), and remaining intra prediction mode information (e.g., intra_mip_mpm_remainder) may be signaled for the MIP, and the not planar flag is not signaled.

In other words, if block partition for an image is generally performed, the current block to be coded and the neighboring block have similar image characteristics. Accordingly, there is a high probability that the current block and the neighboring block have the same or similar intra prediction mode. Accordingly, the encoder may use the intra prediction mode of the neighboring block in order to encode the intra prediction mode of the current block.

For example, the encoder/decoder may configure the most probable mode (MPM) list for the current block. The MPM list may be represented as the MPM candidate list. Here, the term MPM may mean a mode that is used to improve the coding efficiency in consideration of similarity between the current block and the neighboring block during the intra prediction mode coding. As described above, the MPM list may be configured to include the planar mode, or may be configured to exclude the planar mode. For example, if the MPM list includes the planar mode, the number of candidates of the MPM list may be 6. Further, if the MPM list does not include the planar mode, the number of candidates of the MPM list may be 5.

The encoder/decoder may configure the MPM list including 6 MPMs.

In order to configure the MPM list, three kinds of modes of default intra modes, neighbor intra modes, and derived intra modes may be considered.

For the neighbor intra modes, two neighboring blocks, that is, a left neighboring block and a top neighboring block, may be considered.

As described above, if the MPM list is configured not to include the planar mode, the planar mode is excluded from the list, and the number of candidates of the MPM list may be set to 5.

Figure 4:
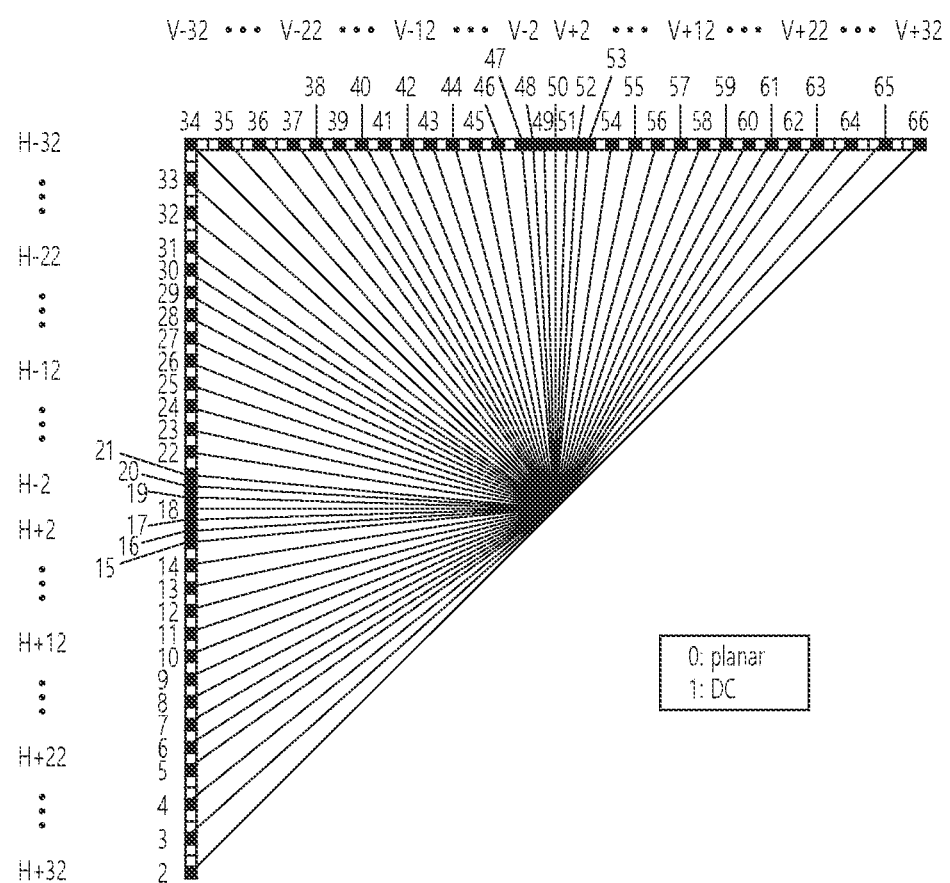
FIG. 4 illustrates an example of 67 intra prediction modes.

FIG. 4 illustrates an example of 67 intra prediction modes.

Referring to FIG. 4, among intra prediction modes, a directional mode or an angular mode may discriminate an intra prediction mode having horizontal directionality and an intra prediction mode having vertical directionality from each other around No. 34 intra prediction mode having top-left diagonal prediction direction. In FIG. 4, H and V mean the horizontal directionality and the vertical directionality, respectively, and numerals of −32 to 32 represent displacements in the unit of 1/32 on a sample grid position. No. 2 to No. 33 intra prediction modes have the horizontal directionality, and No. 34 to No. 66 intra prediction modes have the vertical directionality. No. 18 intra prediction mode and No. 50 intra prediction mode represent a horizontal intra prediction mode and a vertical intra prediction mode, respectively. No. 2 intra prediction mode may be called a bottom-left diagonal intra prediction mode, No. 34 intra prediction mode may be called a top-left diagonal intra prediction mode, and No. 66 intra prediction mode may be called a top-right diagonal intra prediction mode.

Further, the non-directional mode or the non-angular mode among the intra prediction modes may include a DC mode based on the average of the neighboring reference samples of the current block or an interpolation based planar mode.

In the conventional intra prediction, a block to be currently encoded is regarded as one coding unit, and encoding is performed without partitioning. However, in the intra sub-partition coding mode (ISP), intra prediction encoding may be performed by partitioning a block to be currently encoded in a horizontal direction or a vertical direction. In this case, a reconstructed block may be generated by performing encoding/decoding in units of partitioned blocks, and the reconstructed block may be used as a reference block of the next partitioned block. For example, the ISP may perform block partition as shown in Table 1 according to the block size.

TABLE 1

| Block size (CU) | number of partitions |
|---|---|
| 4 × 4 | not partitioned |
| 4 × 8, 8 × 4 | 2 |
| all other cases | 4 |

Figure 5:
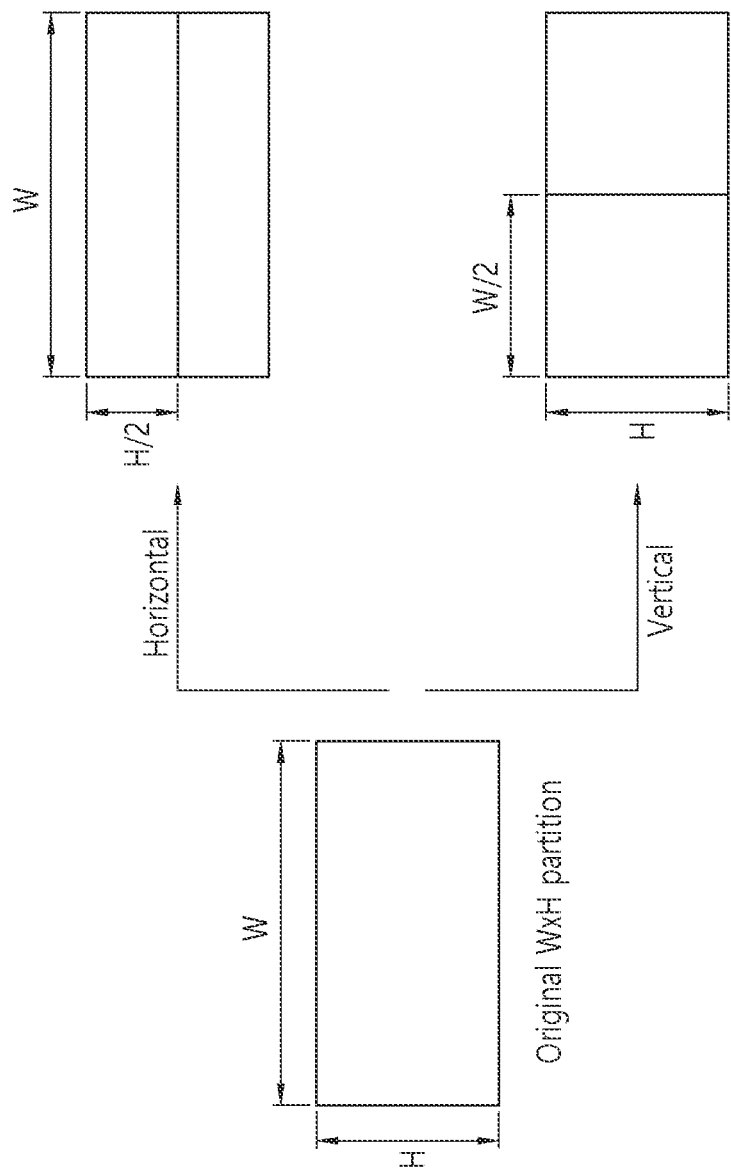
FIG. 5 shows an example of block partitioning according to an ISP in intra prediction.
Figure 6:
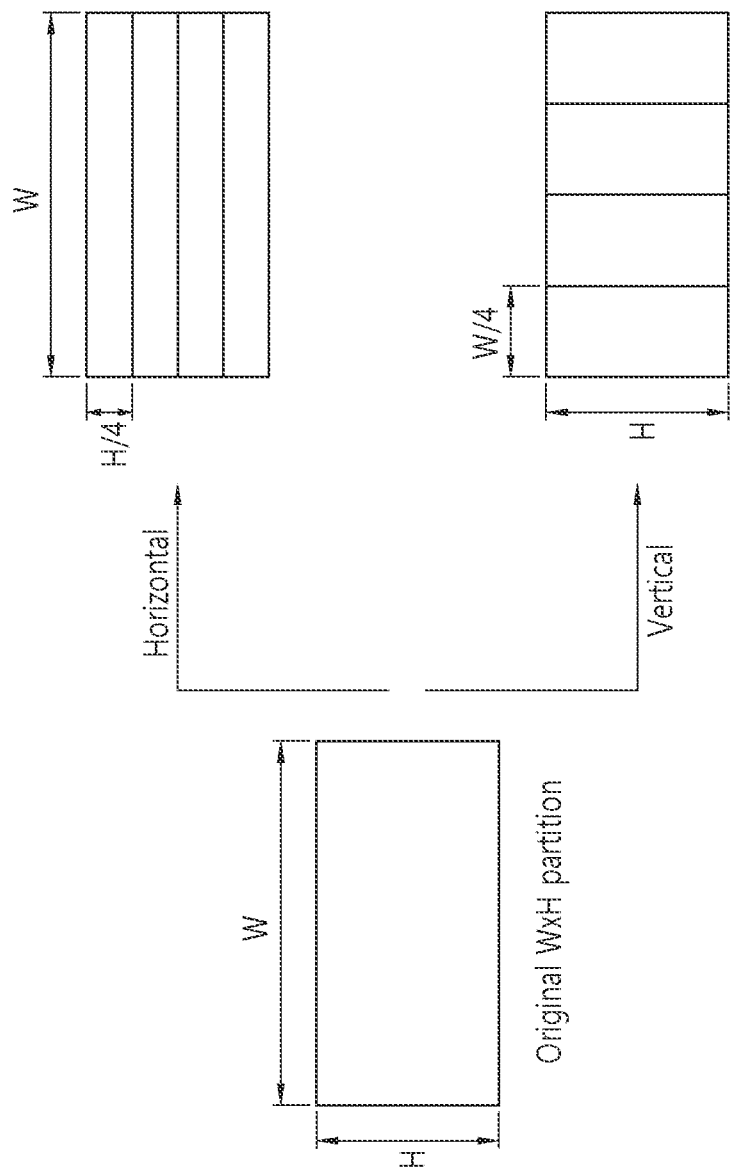
FIG. 6 shows another example of block partition according to an ISP in intra prediction.

Referring to Table 1, block partition according to the ISP may be performed differently depending on the size or shape of the block, for example, the block partition may be performed as shown in FIGS. 5 and 6. In Table 1, the number of partitions may mean the number of sub-partitions, and the sub-partitions may indicate a block generated by partitioning, a partitioned block, or a partitioned area.

FIG. 5 shows an example of block partitioning according to an ISP in intra prediction.

When a size of the block is 4×8 or 8×4, the block may be partitioned into two blocks in the ISP. Here, the partitioned block may be referred to as a sub-partition or a sub-block.

Referring to FIG. 5, horizontal partition or vertical partition may be performed for a block of size W×H. For example, when horizontally partitioned, a block of size W×H may be partitioned into two sub-partitions of size W×H/2. When vertically partitioned, a block of size W×H may be partitioned into two sub-partitions of size W/2×H. Here, W may represent the width of the block, and H may represent the height of the block. Also, W×H may be 4×8 or 8×4.

For example, an 8×4 block may be partitioned into two sub-partitions having a size of 8×2 when horizontally partitioned, or into two sub-partitions having a size of 4×4 when vertically partitioned. Alternatively, a 4×8 size block may be partitioned into two sub-partitions of a size of 4×4 when horizontally divided, or into two sub-partitions of a size of 2×8 when vertically partitioned.

FIG. 6 shows another example of block partition according to an ISP in intra prediction.

When a size of the block is not 4×4, 4×8, or 8×4, the block may be partitioned into 4 blocks in the ISP. That is, in all cases where the size of the block is not 4×4, 4×8, or 8×4, the block may be partitioned into 4 blocks in the ISP. Here, the partitioned block may be referred to as a sub-partition or a sub-block.

Referring to FIG. 6, horizontal partition or vertical partition may be performed for a block of size W×H. For example, when partitioned horizontally, a block of size W×H may be partitioned into 4 sub-partitions of size W×H/4, and when partitioned vertically, a block of size W×H may be partitioned into 4 sub-partitions of size W/4×H. Here, W may represent the width of the block, and H may represent the height of the block. Also, W×H may not be 4×4, 4×8, or 8×4.

In intra prediction, for the ISP, an MPM list may be generated according to each partitioning method (horizontal partitioning and vertical partitioning) to reduce coding complexity, and an optimal mode can be generated by comparing a suitable prediction mode among the prediction modes in the generated MPM list in terms of rate-distortion (RDO). That is, an optimal candidate or an optimal intra prediction mode may be derived from among the candidates or intra prediction modes included in the MPM list, and intra prediction may be performed based on this. Here, an optimal candidate or optimal intra prediction mode may be derived using bit rate-distortion. Alternatively, an optimal candidate may be derived by comparing bit rate-distortion for each candidate in the MPM list.

In addition, when the above-described MRL is used in intra prediction, the ISP may not be used. That is, when intra prediction is performed using multiple reference lines, the ISP cannot be used together. Alternatively, when intra prediction is performed using the 0th reference line, the ISP may be used. Here, the case where intra prediction is performed using the 0th reference line may indicate a case where the MRL is not used or a case where the 0th reference line is used because the intra_luma_ref_idx field value is 0 even though the MRL is used. Also, when ISP is used in intra prediction, PDPC may not be used.

In an embodiment, the ISP-related information for use of the ISP may include information on whether the ISP is applied. Here, the ISP-related information may be referred to as information on intra subpartition or intra subpartition information. Information on whether the ISP is applied may indicate information on whether to apply ISP to the current block, and may include intra_subpartitions_mode_flag. Information on whether the ISP is applied may be expressed as an ISP flag. The ISP-related information may further include information on a split direction when the ISP is applied to the current block by the information on whether the ISP is applied. The information on the split direction may indicate information on whether the partition is horizontal or vertical, and may include intra_subpartitions_split_flag. An embodiment may encode/decode ISP-related information.

ISP-related information may be signaled in units of blocks. Alternatively, it may be signaled through a coding unit (CU) syntax. Alternatively, the coding unit syntax may include information on whether ISP is applied. Alternatively, the coding unit syntax may include information on whether ISP is applied and information on a split direction. Alternatively, the coding unit syntax may be generated in the encoding apparatus and signaled to the decoding apparatus.

Alternatively, the decoding apparatus may perform intra prediction or decoding based on the signaled coding unit syntax. For example, the coding unit syntax may include Table 2 below. Alternatively, the coding unit syntax may include ISP-related information as shown in Table 2 below.

TABLE 2

```
if( CuPredMode[ x0 ][ y0 ]  = =  MODE_INTRA ) {
  if( pcm_enabled_flag  &&
    cbWidth >= MinIpcmCbSizeY  &&  cbWidth <= MaxIpcmCbSizeY &&
    cbHeight >= MinIpcmCbSizeY  &&  cbHeight <= MaxIpcmCbSizeY )
    pcm_flag[ x0 ][ y0 ]                                                    ae(v)
  if( pcm_flag[ x0 ][ y0 ] ) {
    while( !byte_aligned( ) )
      pcm_alignment_zero_bit                                                f(1)
    pcm_sample( cbWidth, cbHeight, treeType)
  } else {
    if( treeType = = SINGLE_TREE  | |  treeType = = DUAL_TREE_LUMA ) {
      if( ( y0 % CtbSizeY ) > 0 )
        intra_luma_ref_idx[ x0 ][ y0 ]                                      ae(v)
      if (intra_luma_ref_idx[ x0 ][ y0 ] = = 0  &&
        ( cbWidth <= MaxTbSizeY  | | cbHeight <= MaxTbSizeY )  &&
        ( cbWidth * cbHeight > MinTbSizeY * MinTbSizeY ))
        intra_subpartitions_mode_flag[ x0 ][ y0 ]                           ae(v)
      if( intra_subpartitions_mode_flag[ x0 ][ y0 ] = = 1  &&
        cbWidth <= MaxTbSizeY  &&   cbHeight <= MaxTbSizeY )
        intra_subpartitions_split_flag[ x0 ][ y0 ]                          ae(v)
      if (intra_luma_ref_idx[ x0 ][ y0 ] = = 0  &&
        intra_subpartitions_mode_flag[ x0 ][ y0 ] = = 0 )
        intra_luma_mpm_flag[ x0 ][ y0 ]                                     ae(v)
      if( intra_luma_mpm_flag[ x0 ][ y0 ] )
        intra_luma_mpm_idx[ x0 ][ y0 ]                                      ae(v)
      else
        intra_luma_mpm_remainder[ x0 ][ y0 ]                                ae(v)
    }
    if( treeType = = SINGLE_TREE  | |  treeType = = DUAL_TREE_CHROMA )
      intra_chroma_pred_mode[ x0 ][ y0 ]                                    ae(v)
  }
} else if( treeType != DUAL_TREE_CHROMA) { /* MODE_INTER */
```

In Table 2, information on whether ISP is applied may include an intra_subpartitions_mode_flag field, and information on a split direction may include an intra_subpartitions_split_flag field.

For example, when the ISP is applied, the intra prediction mode for the current block is equally applied to the sub-partitions, and intra prediction performance can be improved by deriving and using a neighboring reference sample in units of the sub-partitions. That is, when the ISP is applied, the residual sample processing procedure may be performed in units of sub-partitions.

In other words, intra prediction samples may be derived for each sub-partition, and reconstructed samples may be obtained by adding residual signals (residual samples) for the corresponding sub-partition. Here, the residual signal (residual samples) may be derived through an inverse quantization/inverse transformation procedure or the like based on residual information (quantized transform coefficient information or residual coding syntax) in the above-described bitstream.

That is, prediction samples for the first sub-partition may be derived, residual samples may be derived, and based on these, reconstructed samples for the first sub-partition may be derived. In this case, when the prediction samples for the second sub-partition are derived, some of the reconstructed samples in the first sub-partition (eg, left or top neigbhoring reference samples of the second sub-partition) may be used as neighboring reference samples to the second sub-partition. Similarly, derivation of prediction samples for the second sub-partition may be performed, and derivation of residual samples may be performed, and based on theses, reconstructed samples for the second sub-partition may be derived. In this case, when the prediction samples for the third sub-partition are derived, some of the reconstructed samples in the second sub-partition (eg, left or top neighboring reference samples of the third sub-partition) may be used as neighboring reference samples to the third sub-partition. Likewise, reconstructed samples may be derived by performing the same or similar process for other sub-partitions.

Figure 7:
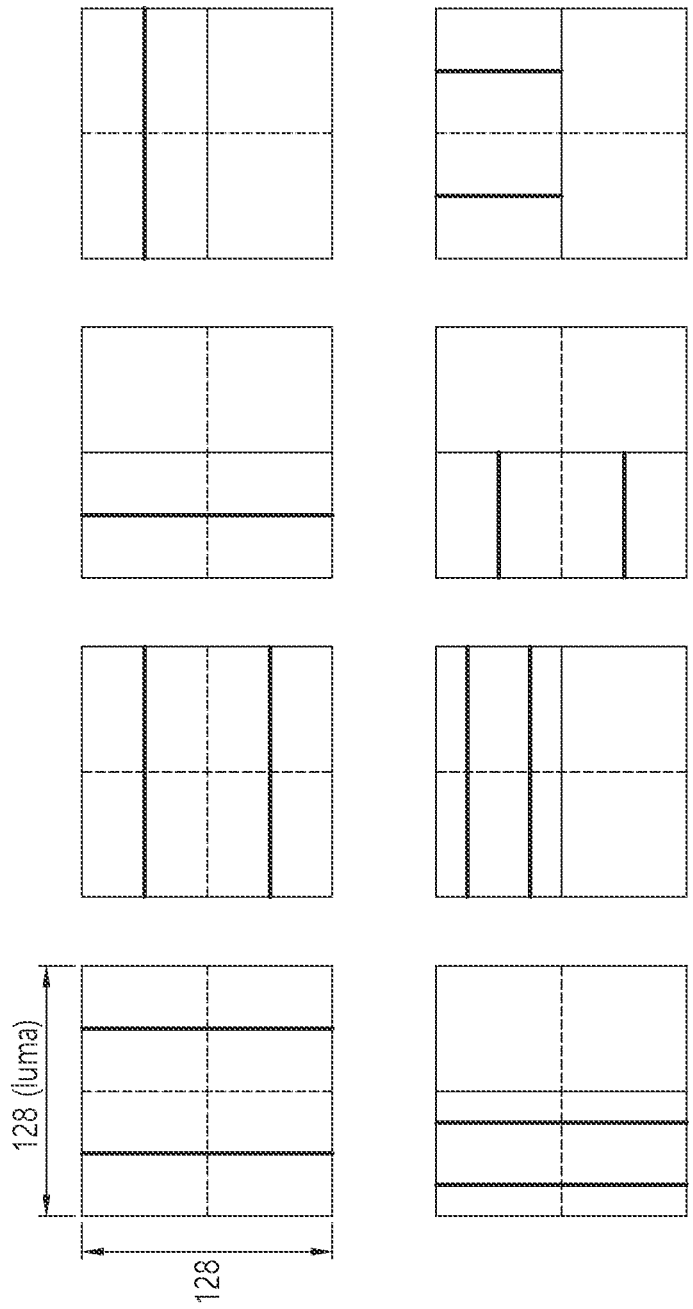
FIG. 7 shows an example of TT and BT partitioning that is not allowed in consideration of the VPDU size.

FIG. 7 shows an example of TT and BT partitioning that is not allowed in consideration of the VPDU size.

Virtual Pipeline Data Units (VPDUs) may be defined for pipeline processing within a picture. The VPDUs may be defined as non-overlapping units in one picture. In a hardware decoder, successive VPDUs can be processed simultaneously by multiple pipeline stages. The VPDU size may be roughly proportional to the buffer size in most pipeline stages. Therefore, keeping the VPDU size small may be important when considering the buffer size from a hardware point of view. In most hardware decoders, the VPDU size may be set equal to the maximum TB (Transform Block) size. For example, the VPDU size may be 64×64 (64×64 luma samples) size. However, as an example, the VPDU size may be changed (increased or decreased) in consideration of a partition according to a ternary tree (TT) and/or a binary tree (BT).

Meanwhile, referring to FIG. 7, in order to maintain the VPDU size as the 64×64 luma samples size, at least one of the restrictions shown in Table 3 may be applied.

TABLE 3

TT split is not allowed for a CU with either width or height, or both width and height equal to 128.
For a 128xN CU with N ≤ 64 (i.e. width equal to 128 and height smaller than 128), horizontal BT is not allowed.

TABLE 3-continued

For an Nx128 CU with N ≤ 64 (i.e. height equal to 128 and width smaller than 128), vertical BT is not allowed.

In other words, when using an ISP, a luma intra prediction block may be divided into two or four sub-partitions vertically or horizontally according to a block size. For example, the minimum block size for the ISP may be 4×8 (or 8×4), and when the block size is greater than 4×8 (or 8×4), the corresponding block may be divided into four sub-partitions.

In addition, when an ISP is used for a block of size M×128 (M is a natural number less than or equal to 64) or 128×N (N is a natural number less than or equal to 64), a potential issue may arise with respect to the 64×64 size Virtual Pipeline Data Unit (VDPU). For example, a coding unit (CU) of size M×128 having a single tree may include a luma transform block (TB) of size M×128 and two M/2×64 chroma TBs. Here, the single tree may represent splitting by the same tree between the luma CU and the corresponding chroma CU. Here, when the CU uses an ISP, the luma TB may be partitioned into 4 M×32 sized TBs (only horizontal partition is possible here), each of which may be smaller than a 64×64 block. However, in the current ISP design, chroma blocks, that is, TBs may not be partitioned. Thus, all of the chroma components may be larger than a 32×32 block. Similarly, a similar situation may occur when a CU of size 128×N uses an ISP, and the above two cases may be an issue in the 64×64 decoder pipeline.

Accordingly, an embodiment may provide a method in consideration of the size of the VPDU in the process of applying the ISP to the CU. That is, an embodiment may consider a Virtual Pipeline Data Unit (VPDU) in the process of applying the ISP. Alternatively, an embodiment may provide a decoding pipeline in consideration of VPDUs when performing ISP. Alternatively, an embodiment may provide an ISP method in consideration of a decoding pipeline for hardware (HW) implementation in consideration of the VPDU. Alternatively, in one embodiment, an ISP method in consideration of hardware, that is, a method of signaling an ISP in consideration of VPDU may be provided.

Figure 8:
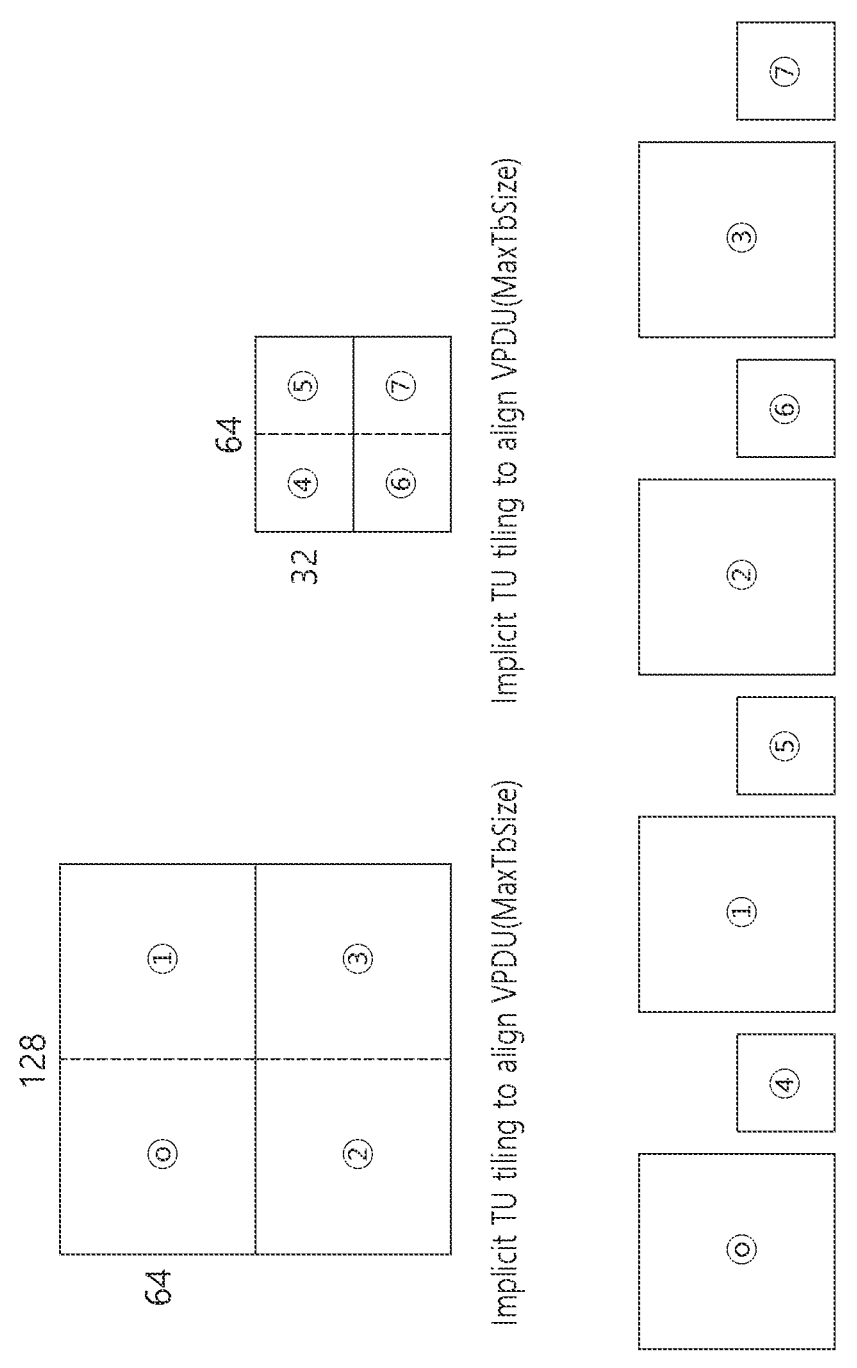
FIG. 8 shows an example of a pipeline of HW processing.

FIG. 8 shows an example of a pipeline of HW processing.

In processing considering hardware (HW), a pipeline may be as shown in FIG. 8. Alternatively, decoding may be performed in units of VPDUs as shown in FIG. 8. Alternatively, according to an embodiment, each block may be sequentially processed according to an arrow. Alternatively, according to an embodiment, some blocks may be processed in parallel according to the order of the arrows.

For example, it is assumed that the size of the luma CU is 128×128, the size of the corresponding chroma CU is 64×64, and it may be divided into four blocks according to a quad tree. In this case, the luma CU may be divided into 4 blocks of 64×64 size, and the chroma CU may be divided into 4 blocks of 32×32 size. Here, four blocks of 64×64 size divided from the luma CU are represented as a 0th block, a first block, a second block, and a third block in the order of upper left, upper right, lower left and lower right, and 4 blocks of 32×32 size divided from the chroma CU The blocks may be represented as a fourth block, a fifth block, a sixth block, and a seventh block in the order of upper left, upper right, lower left, and lower right.

In this case, the processing of each of blocks may have an order of a 0th block that is as a luma component, a fourth block that is as a chroma component corresponding to the 0th block, a first block that is as a luma component, a fifth block that is as a chroma component corresponding to the first block, a second block that is as a luma component, a sixth block that is as a chroma component corresponding to the second block, a third block that is as a luma component, and a seventh block that is as a chroma component corresponding to the third block. Alternatively, VPDU processing may be performed according to the above-described order. Here, the size of the VPDU may be 64×64. Alternatively, the VPDU size for the luma component may be 64×64, and the VPDU size for the chroma component may be 32×32. Alternatively, the VPDU may be equal to the maximum transform block size (per component).

However, as described above, when the ISP is applied to the CU, an issue may occur. That is, when ISP is applied to a block having a size larger than the VPDU size, a problem may appear in terms of hardware, which will be described in detail with reference to FIG. 9.

Figure 9:
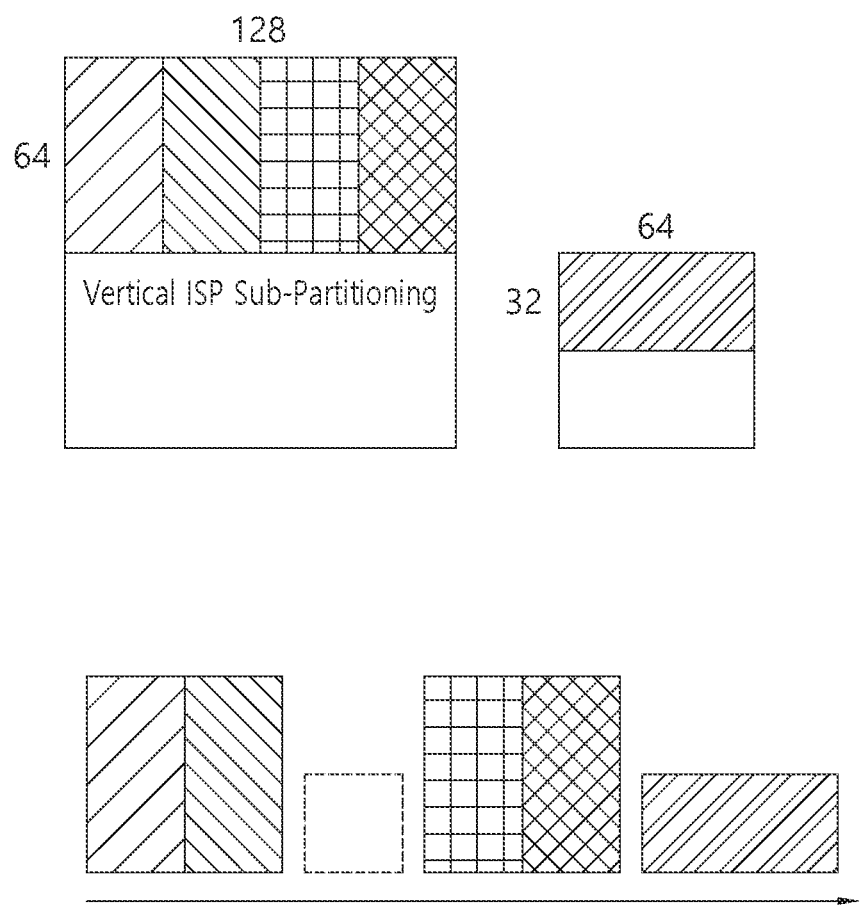
FIG. 9 shows an example of a pipeline when an ISP is applied to a block larger than the VPDU size.

FIG. 9 shows an example of a pipeline when an ISP is applied to a block larger than the VPDU size.

For example, it is assumed that the size of the luma CU is 128×128, the size of the corresponding chroma CU is 64×64, having a single tree structure, and is divided into two blocks according to a horizontal binary tree. In this case, the luma CU may be divided into two blocks of 128×64 size, and the chroma CU may be divided into two blocks of 64×32 size. Here, looking at the case of applying ISP to the current CU, the ISP may be applied to the upper block among the two blocks divided from the luma CU, and the upper block may be divided into four sub-partitions of 32×62 size according to the application of the ISP. However, the ISP may be applied only to the luma component according to the design of the ISP, and in this case, the ISP may not be applied to the chroma CU or two blocks divided from the chroma CU. Here, the four sub-partitions may be referred to as a first sub-partition, a second sub-partition, a third sub-partition, and a fourth sub-partition from left to right.

In this case, the first sub-partition and the second sub-partition, which are luma components, may be processed first in consideration of the 64×64 VPDU. Here, since the chroma CU is not divided or specified into only regions or samples corresponding to the first and second sub-partitions, the chroma components corresponding to the first and second sub-partitions may not be processed immediately. That is, after the third sub-partition and the fourth sub-partition that are the luma components are processed, the chroma component corresponding to the first to fourth sub-partitions (the upper block among the two blocks divided from the chroma CU) may be processed. However, the VPDU may have a size of 32×32 for the chroma component, in this case, since the size of the upper block among the two blocks divided from the chroma CU is 64×32, it may not be performed in units of pipelines of the VPDU. Alternatively, coding efficiency may be reduced.

For example, in the above description, since the size of the VPDU may be determined as the maximum transform block size, referring to Table 4, The maximum transform block size may have a preset maximum transform block size for the luma component, and may have a size half of the preset maximum transform block size for the chroma component. Here, the preset maximum transform block size may be 64×64, but is not limited thereto.

TABLE 4

8.4.4 Decoding process for intra blocks
8.4.4.1 General decoding process for intra blocks
Inputs to this process are:
  a sample location ( xTb0, yTb0 ) specifying the top left sample of the current transform block relative to the top-left sample of the current picture,
  a variable nTbW specifying the width of the current transform block,
  a variable nTbH specifying the height of the current transform block,
  a variable predModeIntra specifying the intra prediction mode,
  a variable cIdx specifying the colour component of the current block.
Output of this process is a modified reconstructed picture before in-loop filtering.
The maximum transform block size maxTbSize is derived as follows:
  maxTbSize = ( cIdx = = 0 ) ? MaxTbSizeY : MaxTbSizeY / 2

In Table 4, the cIdx field value may include a color component index or information indicating a color component, may indicate a luma (Y) component if the cIdx field value is 0, and may indicate a chroma component (Cb) if the cIdx field value is 1, and may indicate a chroma component (Cr) if the cIdx field value is 2.

In other words, the maximum transform block size (maxTbSize) may be determined as a preset MaxTbSizeY in the case of a luma component (cIdx==0), and may be determined as a preset MaxTbSize Y/2 if it is not a luma component (cIdx!=0).

An embodiment according to this document may propose a method of disabling ISP coding for a block having a size of 128×N and/or N×128 in order to solve the above-mentioned issue or problem. Alternatively, according to an embodiment, the size of a block to which an ISP cannot be applied may be set. Alternatively, according to an embodiment, a condition in which the ISP cannot be applied based on the size of the (luma component) block may be set.

For example, the ISP flag (ex. intra_subpartitions_mode_flag) indicating whether ISP is applied to the current block (ex. CU/CB) may be signaled and/or parsed when both conditions i) a width of the current block is less than or equal to MaxTbSizeY (that is, the width/height of the maximum transform block for the luma component), and ii) a height of the current block is less than or equal to MaxTbSizeY.

However, if the above condition is not satisfied, the ISP flag may not be signaled and/or parsed, and its value may be estimated as 0.

That is, if both conditions are satisfied: i) a width of the current block width is less than or equal to MaxTbSizeY, and ii) a height of the current block height is less than or equal to MaxTbSizeY, the ISP is enabled. Otherwise, the ISP may not be available (disable). Here, it has been described that the width and height of the maximum transform block (TB) are set to be the same, but the present disclosure is not limited thereto, and the maximum TB width and height may be set differently.

In other words, only when both the width and height of the current block are smaller than or equal to the maximum transform block size, the ISP can be applied to the current block. Alternatively, ISP related information for the current block may be signaled. Alternatively, ISP may be applied to the block of the current luma component only when both the width and height of the block of the current luma component are less than or equal to the maximum transform block size. Alternatively, ISP related information for a block of the current luma component may be signaled.

For example, ISP related information may be signaled in units of blocks based on the above-described conditions. Alternatively, when the above-described conditions are satisfied, the information may be signaled through a coding unit (CU) syntax. Alternatively, the coding unit syntax may include information on whether the ISP is applied when the above-described conditions are satisfied. Alternatively, when the above-described conditions are satisfied, the coding unit syntax may include information on whether ISP is applied and information on a split direction. Alternatively, the coding unit syntax may be generated in the encoding apparatus and signaled to the decoding apparatus. Alternatively, the decoding apparatus may perform intra prediction or decoding based on the signaled coding unit syntax.

For example, the coding unit syntax in consideration of the above-described conditions may be represented as shown in Table 5 below. Alternatively it may includes Table 5. Alternatively, the coding unit syntax may include ISP related information as shown in Table 5 below.

TABLE 5

| | Descriptor |
|---|---|
| coding_unit( x0, y0, cbWidth, cbHeight, treeType ) { | |
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = =0 ) \|\| | |
|       ( tile_group_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( ( y0 % CtbSizeY ) > 0 ) | |

TABLE 5-continued

| | Descriptor |
|---|---|
|     intra_luma_ref_idx[ x0 ][ y0 ]<br>    if (intra_luma_ref_idx[ x0 ][ y0 ] = = 0  &&<br>        ( cbWidth <= MaxTbSizeY && cbHeight <= MaxTbSizeY ) &&<br>        ( cbWidth * cbHeight > MinTbSizeY * MinTbSizeY ))<br>        intra_subpartitions_mode_flag[ x0 ][ y0 ] | ae(v)<br><br><br><br>ae(v) |
|     if( intra_subpartitions_mode_flag[ x0 ][ y0 ] = = 1  &&<br>        cbWidth <= MaxTbSizeY  &&   cbHeight <= MaxTbSizeY )<br>        intra_subpartitions_split_flag[ x0 ][ y0 ] | <br><br>ae(v) |
|     if( intra_luma_ref_idx[ x0 ][ y0 ] = = 0  &&<br>        intra_subpartitions_mode_flag[ x0 ][ y0 ] = = 0 )<br>        intra_luma_mpm_flag[ x0 ][ y0 ] | <br><br>ae(v) |
|     if( intra_luma_mpm_flag[ x0 ][ y0 ] )<br>        intra_luma_mpm_idx[ x0 ][ y0 ]<br>    else<br>        intra_luma_mpm_remainder[ x0 ][ y0 ]<br>    }<br>    if( treeType = = SINGLE_TREE  ||   treeType = = DUAL_TREE_CHROMA )<br>        intra_chroma_pred_mode[ x0 ][ y0 ]<br>    }<br>} else if( treeType != DUAL_TREE_CHROMA ) { /* MODE_INTER or MODE_IBC */<br>    ....<br>} | <br>ae(v)<br><br>ae(v)<br><br><br>ae(v) |

Referring to Table 5, in an embodiment, when (intra_luma_ref_idx[x0][y0]==0 && (cbWidth<=MaxTbSizeY && cbHeight<=MaxTbSizeY) && (cbWidth*cbHeight>MinTbSizeY*MinTbSizeY))) is satisfied, it may include information on whether the ISP is applied including intra_subpartitions_mode_flag field. Alternatively, if (cb Width<=MaxTbSizeY && cbHeight<=MaxTbSizeY) is satisfied, information on whether ISP is applied including the intra_subpartitions_mode_flag field may be included. Here, cb Width may indicate the width of the current (luma) block, chHeight may indicate the height of the current (luma) block, and Max TbSize Y may indicate the maximum transform block size.

In addition, an embodiment, includes the field when the intra_subpartitions_mode_flag field has a value of 1 or when (intra_subpartitions_mode_flag[x0][y0]==1 && cbWidth<=MaxTbSizeY && cbHeight<=MaxTbSizeY) is satisfied, information on a split direction including intra_subpartitions_split_flag field may be included.

For example, semantics of intra_subpartitions_mode_flag and intra_subpartitions_split_flag may be represented as shown in Table 6.

Figure 10:
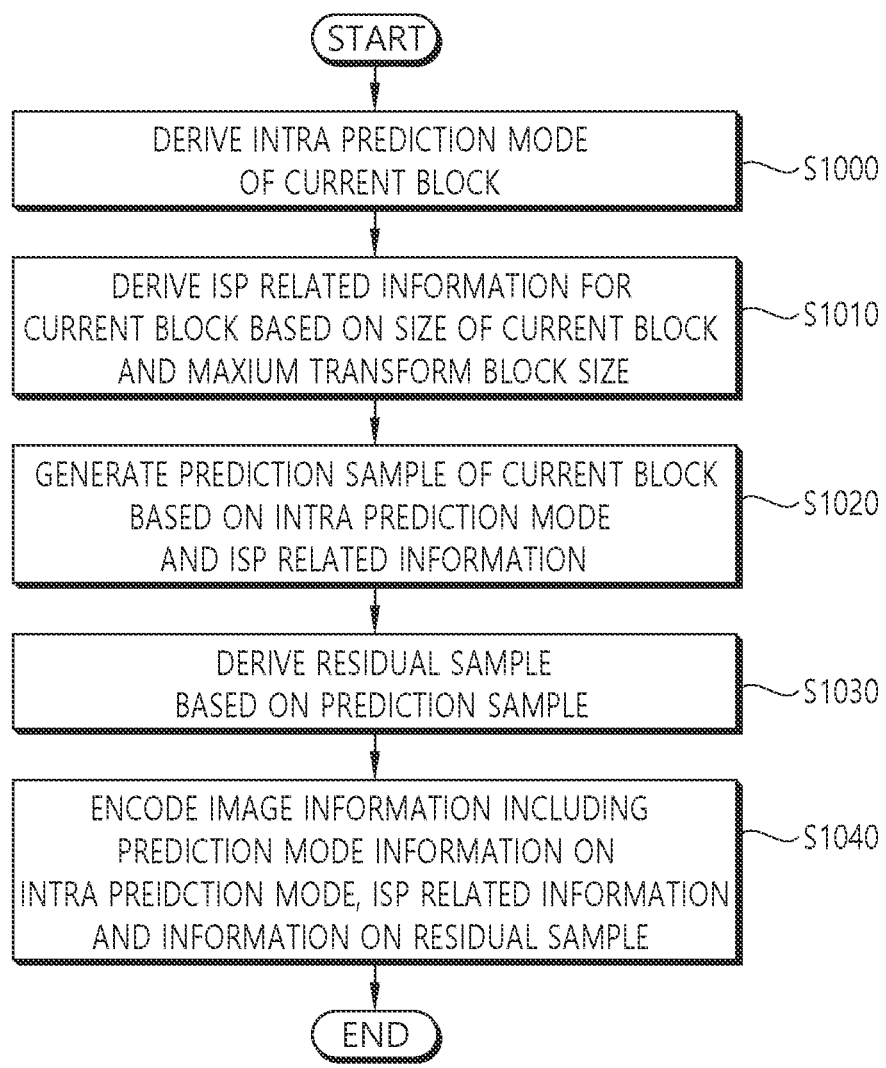
FIG. 10 schematically illustrates an image encoding method by an encoding apparatus according to the present document.

FIG. 10 schematically illustrates an image encoding method by an encoding apparatus according to the present document.

The method disclosed in FIG. 10 may be performed by the encoding apparatus disclosed in FIG. 2. Specifically, for example, steps S1000 to S1020 of FIG. 10 may be performed by a predictor of the encoding apparatus, step S1030 may be performed by a subtractor of the encoding apparatus, and step S1040 may be performed by an entropy encoder of the encoding apparatus. Also, although not shown, the process of generating information about the residual for the current block based on the residual sample may be performed by the transformer of the encoding apparatus.

The encoding apparatus derives the intra prediction mode of the current block (S1000). For example, the encoding apparatus may derive the intra prediction mode of the current block based on neighboring samples of the current block. Alternatively, the encoding apparatus may derive a reference samples of the current block based on neighboring samples of the current block, and may determine the intra prediction mode accordingly. Alternatively, the encoding apparatus may derive an MPM list for determining the intra

TABLE 6 intra_subpartitions_mode_flag[ x0 ][ y0 ] equal to 1 specifies that the current intra coding
unit is partitioned into NumIntraSubPartitions[ x0 ][ y0 ] rectangular transform block
subpartitions, intra_subpartitions_mode_flag[ x0 ][ y0 ] equal to 0 specifies that the current
intra coding unit is not partitioned into rectangular transform block subpartitions.
intra_subpartitions_split_flag[ x0 ][ y0 ] specifies whether the intra subpartitions split type is
horizontal or vertical. When intra_subpartitions_split_flag[ x0 ][ y0 ] is not present, it is inferred
to be equal to 0.
The variable IntraSubPartitionsSplitType specifies the type of split used for the current luma
coding block as illustrated in following table. IntraSubPartitionsSplitType is derived as follows:
If intra_subpartitions_mode_flag[ x0 ][ y0 ] is equal to 0, IntraSubPartitionsSplitType is set
equal to 0.
Otherwise, the IntraSubPartitionsSplitType is set equal to 1 + intra_subpartitions_split_flag
[ x0 ][ y0 ].

| Name association to IntraSubPartitionsSplitType | |
|---|---|
| IntraSubPartitionsSplitType | Name of IntraSubPartitionsSplitType |
| 0 | ISP_NO_SPLIT |
| 1 | ISP_HOR_SPLIT |
| 2 | ISP_VER_SPLIT | prediction mode of the current block, and may generate MPM list related information for determining the intra prediction mode from the MPM list. For example, the MPM list related information may include MPM index information, and an intra prediction mode may be determined from the MPM list based on the MPM index information.

The encoding apparatus derives ISP related information for the current block based on the size of the current block and the maximum transform block size (S1010). For example, the encoding apparatus may derive ISP related information by comparing the width and/or height of the current block with the maximum transform block size. Alternatively, when the width of the current block is less than or equal to the maximum transform block size and the height of the current block is less than or equal to the maximum transform block size, the encoding apparatus may derive ISP related information for the current block. Alternatively, the encoding apparatus may derive the ISP related information with respect to the current block having a width smaller than or equal to the maximum transform block size and a height smaller than or equal to the maximum transform block size. Here, the maximum transform block size may be expressed as maxTbsizeY, and the width and height may be the same. Alternatively, the maximum transform block size may have different width and height. For example, when the width of the current block is less than or equal to the width of the maximum transformation block and the height of the current block is less than or equal to the height of the maximum transformation block, the encoding apparatus may derive ISP related information for the current block.

For example, the ISP related information may include information on whether the ISP is applied to the current block. That is, the encoding apparatus may derive information on whether ISP is applied to the current block by comparing the width and/or height of the current block with the maximum transform block size. Alternatively, when the width of the current block is less than or equal to the maximum transform block size and the height of the current block is less than or equal to the maximum transform block size, the encoding device may derive information on whether ISP is applied to the current block. Alternatively, the encoding device may derive the ISP related information for the current block having a width less than or equal to the maximum transform block size and a height less than or equal to the maximum transform block size, wherein the ISP related information includes information on whether ISP is applied to the current block. Here, information on whether ISP is applied to the current block may include an intra_subpartitions_mode_flag field. Here, the intra_subpartitions_mode_flag field may be represented as an ISP flag. For example, the intra_subpartitions_mode_flag field may have a value of 0 or 1. Also, information on whether ISP is applied to the current block may be included in the coding unit syntax.

For example, the information on whether the ISP is applied may include information on applying the ISP to the current block or information not applying the ISP to the current block. For example, when the information on whether ISP is applied includes the intra_subpartitions_mode_flag field, the information on applying the ISP to the current block may indicate a case where the value of the intra_subpartitions_mode_flag field is 1, and the information not applying the ISP to the current block may indicate a case in which the value of the intra_subpartitions_mode_flag field is 0. Alternatively, the information for applying ISP to the current block may indicate a case in which the value of the intra_subpartitions_mode_flag field is 0, and the information not applying ISP to the current block may indicate a case in which the value of the intra_subpartitions_mode_flag field is 1. In other words, information on applying ISP to the current block or information not applying ISP to the current block may be indicated by the value of the intra_subpartitions_mode_flag field.

For example, the ISP related information may include information on whether ISP is applied to the current block and information on a split direction. Alternatively, when the information on whether ISP is applied includes information for applying the ISP to the current block, the ISP related information may include information on the split direction. Alternatively, when the ISP related information includes the information for applying the ISP to the current block, the information on the split direction may also be included. Alternatively, the ISP related information may further include information on a split direction based on the information on whether the ISP is applied, indicating that the ISP is applied to the current block. For example, the information on the split direction may include an intra_subpartitions_split_flag field. Here, the intra_subpartitions_split_flag field may be represented as a split direction flag. For example, the intra_subpartitions_split_flag field may have a value of 0 or 1. For example, when information on the split direction includes the intra_subpartitions_split_flag field, information in which the splitting direction is horizontal may indicate a case in which the value of the intra_subpartitions_split_flag field is 0, and information in which the splitting direction is vertical may indicate when the value of the intra_subpartitions_split_flag field is 1. Alternatively, information in which the splitting direction is horizontal may indicate a case in which the value of the intra_subpartitions_split_flag field is 1, and information in which the splitting direction is vertical may indicate a case in which the value of the intra_subpartitions_split_flag field is 0.

Alternatively, when the width or height of the current block is greater than the maximum transform block size, the ISP related information may include information not to apply an ISP to the current block. For example, when the width or height of the current block is greater than the maximum transform block size, information on whether ISP is applied to the current block may not be included. Or it may not be derived. Here, when information on whether the ISP is applied is not derived, it may be implied that information not applying the ISP to the current block is derived.

The encoding apparatus generates a prediction sample of the current block based on the intra prediction mode and ISP related information (S1020). For example, when applying ISP to the current block based on ISP related information, the encoding apparatus may determine the intra prediction mode equally for the divided sub-partitions. Alternatively, the intra prediction mode may be equally applied to sub-partitions. For example, when the ISP is applied to the current block, the encoding apparatus may derive the MPM list according to the split direction. Alternatively, the encoding device may further acquire MPM list related information, and may derive another MPM list according to the split direction. For example, different MPM lists can be derived when divided in the horizontal direction and when divided in the vertical direction. The encoding apparatus may derive the MPM list differently according to the split direction, determine the intra prediction mode based on the derived MPM list, and apply the determined intra prediction mode to the sub-partitions equally.

For example, a prediction sample may be generated based on the intra prediction mode and sub-partitions of the current block. Also, the sub-partitions of the current block may be derived based on the information on the split direction. That is, the sub-partitions of the current block may be derived by being divided in the vertical direction or may be derived by being divided in the horizontal direction. For example, the MPM list may be derived differently according to the split direction as described above.

For example, the sub-partitions of the current block may include a first sub-partition and a second sub-partition. Alternatively, the sub-partitions of the current block may include a first sub-partition, a second sub-partition, a third sub-partition, and a fourth sub-partition. Here, the number of sub-partitions may be determined based on the size of the current block.

For example, when the current block is divided into a first sub-partition and a second sub-partition, a prediction sample of the first sub-partition may be generated based on the intra prediction mode and neighboring samples of the first sub-partition, a prediction sample of the second sub-partition may be generated based on the intra prediction mode and the prediction sample of the first sub-partition. That is, the prediction sample of the first sub-partition may be generated based on the left neighboring sample and/or the top neighboring sample of the first sub-partition according to the intra prediction mode. Alternatively, a reference sample of the first sub-partition may be derived based on the left neighboring sample and/or the top neighboring sample of the first sub-partition according to the intra prediction mode, and the prediction sample of the first sub-partition may be generated based on the derived reference sample. A reference sample of the second sub-partition may be derived based on the left neighboring sample and/or the top neighboring sample of the second sub-partition according to the intra prediction mode, and a prediction sample of the second sub-partition may be generated based on the derived reference sample. Here, the prediction sample of the first sub-partition may be used as a neighboring sample of the second sub-partition. Alternatively, it may be derived as a reference sample of the second sub-partition. Here, the intra prediction mode of the second sub-partition may be the same as the intra prediction mode of the first sub-partition.

Alternatively, the encoding apparatus may directly use the prediction sample as a reconstructed sample according to the prediction mode. Also, the encoding apparatus may generate a predicted block of the current block based on the prediction sample. Also, the encoding apparatus may generate a residual sample based on the original sample and the generated prediction sample. The encoding apparatus may generate information on the residual based on the residual sample. The information on the residual may include transform coefficients on the residual sample. The encoding apparatus may derive the reconstructed sample based on the prediction sample and the residual sample. That is, the encoding apparatus may derive the reconstructed sample by adding the prediction sample and the residual sample. Here, the encoding apparatus may generate a residual block based on the original block and the predicted block, and may also generate information on the residual based on the residual block.

The encoding apparatus derives a residual sample based on the prediction sample (S1030). For example, the encoding apparatus may derive a residual sample for the current block based on an original sample and a prediction sample for the current block. However, the encoding apparatus may use the prediction sample as the reconstructed sample, and in this case, the encoding apparatus may omit the process of deriving the residual sample based on the prediction sample. Alternatively, although not shown, the encoding apparatus may generate a reconstructed sample by adding a residual sample to the prediction sample.

The encoding apparatus encodes image information including prediction mode information on the intra prediction mode, ISP related information, and information on the residual sample (S1040). For example, the encoding apparatus may determine the prediction mode of the current block and may generate information indicating the prediction mode. Alternatively, the encoding apparatus may determine the intra prediction mode of the current block, and may generate prediction mode information of the current block including information on the intra prediction mode. The prediction mode information may include information on prediction of the current block or various information for prediction. The prediction mode information may include MPM list related information. Alternatively, the MPM list related information may include MPM index information for an intra prediction mode used for intra prediction of a current block in the MPM list.

Also, the encoding device may generate ISP related information. The ISP related information may include information on whether the ISP is applied to the current block. Alternatively, the ISP related information may include information on whether the ISP is applied to the current block and information on the split direction. Alternatively, the ISP related information may include information indicating that an ISP is not applied to the current block. Also, the encoding apparatus may generate information on the residual. The information on the residual may include information on the residual sample (or the residual sample array). Alternatively, the information on the residual may include transform coefficients on the residual sample.

The encoding apparatus may generate a bitstream by encoding image information including all or some of the above-described information. Alternatively, it can be output in the form of a bitstream. Also, the bitstream may be transmitted to the decoding apparatus through a network or a storage medium. Alternatively, the bitstream may be stored in a computer-readable storage medium.

Figure 11:
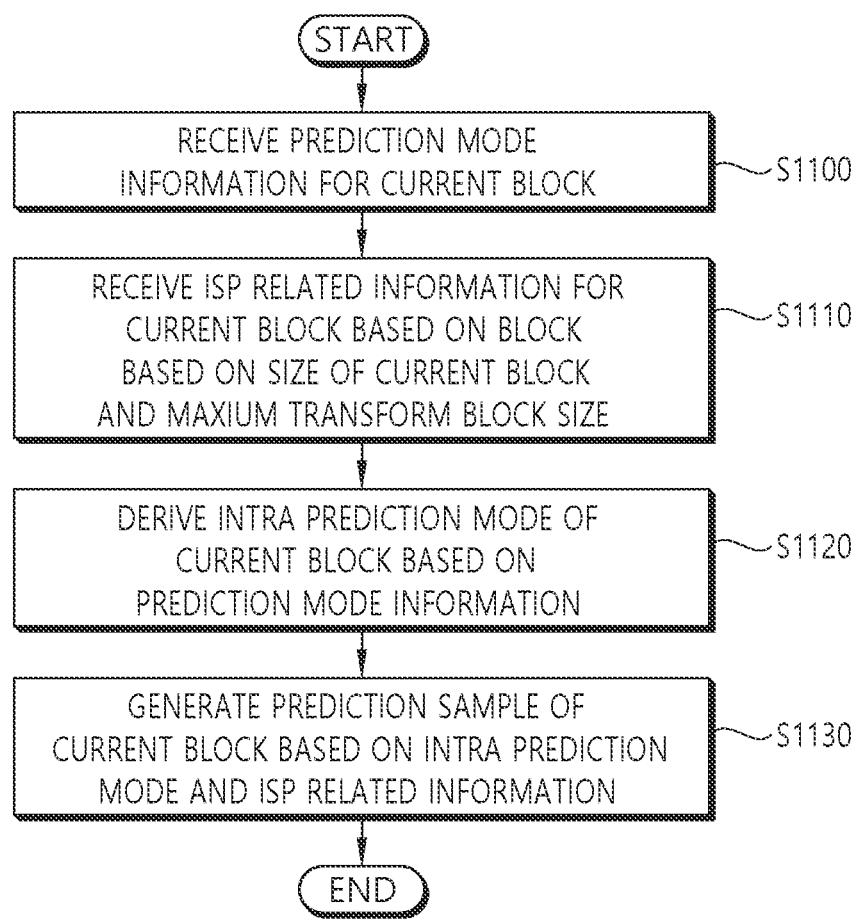
FIG. 11 schematically illustrates an image decoding method by a decoding apparatus according to the present document.

FIG. 11 schematically illustrates an image decoding method by a decoding apparatus according to the present document.

The method disclosed in FIG. 11 may be performed by the decoding apparatus illustrated in FIG. 3. Specifically, for example, S1100 of FIG. 11 may be performed by an entropy decoder of the decoding apparatus, and S1110 to S1130 may be performed by a predictor of the decoding apparatus. In addition, although not shown, the process of obtaining image information including information on prediction of a current block and information on residual through a bitstream may be performed by an entropy decoder of the decoding apparatus, and the process of deriving the residual sample for the current block based on the information on the residual may be performed by an inverse transformer of the decoding apparatus, and a process of generating a reconstructed picture based on a prediction sample and the residual sample may be performed by an adder of the decoding apparatus.

The decoding apparatus receives prediction mode information of the current block (S1100). For example, the prediction mode information may include information on the intra prediction mode of the current block. Alternatively, information on prediction of the current block or various information for prediction may be included. For example, the decoding apparatus may obtain prediction mode information from the bitstream. Alternatively, the decoding apparatus may entropy-decode the bitstream to obtain prediction mode information. Alternatively, the decoding apparatus may obtain prediction mode information by parsing the bitstream.

The decoding apparatus receives ISPrelated information on the current block based on the size of the current block and the maximum transform block size (S1110). For example, the decoding apparatus may receive or derive ISP related information by comparing the width and/or height of the current block with the maximum transform block size. Alternatively, when the width of the current block is less than or equal to the maximum transform block size and the height of the current block is less than or equal to the maximum transform block size, the decoding apparatus may receive ISP related information on the current block. Alternatively, the decoding apparatus may receive the ISP related information with respect to the current block having a width smaller than or equal to the maximum transform block size and a height smaller than or equal to the maximum transform block size. Here, the maximum transform block size may be expressed as maxTbsizeY, and the width and height may be the same. Alternatively, the maximum transform block size may have different width and height. For example, when the width of the current block is less than or equal to the width of the maximum transformation block, and the height of the current block is less than or equal to the height of the maximum transformation block, the decoding apparatus may derive ISP related information for the current block.

For example, the ISP related information may include information on whether the ISP is applied to the current block. That is, the decoding apparatus may compare the width and/or height of the current block with the maximum transform block size to receive information on whether ISP is applied to the current block. Alternatively, when the width of the current block is less than or equal to the maximum transform block size and the height of the current block is less than or equal to the maximum transform block size, the decoding apparatus may receive information on whether ISP is applied to the current block. Alternatively, the decoding apparatus may receive the ISP related information for the current block having a width less than or equal to the maximum transform block size and a height less than or equal to the maximum transform block size, and the ISP related information may include information on whether ISP is applied to the current block. Here, information on whether ISP is applied to the current block may include an intra_subpartitions_mode_flag field. Here, the intra_subpartitions_mode_flag field may be represented as an ISP flag. For example, the intra_subpartitions_mode_flag field may have a value of 0 or 1. Also, information on whether ISP is applied to the current block may be included in the coding unit syntax.

For example, the information on whether the ISP is applied may include information on applying the ISP to the current block or information not applying the ISP to the current block. For example, when the information on whether ISP is applied includes the intra_subpartitions_mode_flag field, the information on applying the ISP to the current block may indicate a case where the value of the intra_subpartitions_mode_flag field is 1, and the information not applying the ISP to the current block may indicate a case in which the value of the intra_subpartitions_mode_flag field is 0. Alternatively, the information on applying ISP to the current block may indicate a case in which the value of the intra_subpartitions_mode_flag field is 0, and the information not applying ISP to the current block may indicate a case in which the value of the intra_subpartitions_mode_flag field is 1. In other words, information on applying ISP to the current block or information not applying ISP to the current block may be indicated by the value of the intra_subpartitions_mode_flag field.

For example, the ISP related information may include information on whether ISP is applied to the current block and information on a split direction. Alternatively, when the information on whether ISP is applied includes information for applying the ISP to the current block, the ISP related information may include information on the split direction. Alternatively, when the ISP related information includes the information for applying the ISP to the current block, the information on the split direction may also be included. Alternatively, the ISP related information may further include information on a split direction based on the information on whether the ISP is applied, indicating that the ISP is applied to the current block. For example, the information on the split direction may include an intra_subpartitions_split_flag field. Here, the intra_subpartitions_split_flag field may be represented as a split direction flag. For example, the intra_subpartitions_split_flag field may have a value of 0 or 1. For example, when information on the split direction includes the intra_subpartitions_split_flag field, information in which the splitting direction is horizontal may indicate a case in which the value of the intra_subpartitions_split_flag field is 0, and information in which the splitting direction is vertical may indicate when the value of the intra_subpartitions_split_flag field is 1. Alternatively, information in which the splitting direction is horizontal may indicate a case in which the value of the intra_subpartitions_split_flag field is 1, and information in which the splitting direction is vertical may indicate a case in which the value of the intra_subpartitions_split_flag field is 0.

Alternatively, when the width or height of the current block is greater than the maximum transform block size, the ISP related information may include information not to apply an ISP to the current block. For example, when the width or height of the current block is greater than the maximum transform block size, information on whether ISP is applied to the current block may not be included. Or it may not be derived. Here, when information on whether ISP is applied is not derived, it may be implied that information not applying the ISP to the current block is derived.

The decoding apparatus derives the intra prediction mode of the current block based on the prediction mode information (S1120). For example, the prediction mode information may include information on the intra prediction mode of the current block, and the decoding apparatus may determine the intra prediction mode of the current block based on the information on the intra prediction mode of the current block. Alternatively, the decoding apparatus may further obtain MPM list related information, and may determine an intra prediction mode based on the MPM list related information. Alternatively, the MPM list related information may include MPM index information, and the decoding apparatus may determine an intra prediction mode of the current block in the MPM list based on the MPM index information.

The decoding apparatus generates a prediction sample of the current block based on the intra prediction mode and ISP related information (S1130). For example, when applying ISP to the current block based on ISP related information, the decoding apparatus may determine the intra prediction mode equally for the divided sub-partitions. Alternatively, the intra prediction mode may be equally applied to sub-partitions. For example, when applying ISP to the current block, the decoding apparatus may derive the MPM list according to the split direction. Alternatively, the decoding apparatus may further acquire MPM list related information, and may derive another MPM list according to the split direction. For example, different MPM lists can be derived when it is divided in the horizontal direction and when it is divided in the vertical direction. The decoding apparatus may derive the MPM list differently according to the split direction, determine the intra prediction mode based on the derived MPM list, and apply the determined intra prediction mode to the sub-partitions equally.

For example, a prediction sample may be generated based on the intra prediction mode and sub-partitions of the current block. Also, the sub-partitions of the current block may be derived based on the information on the split direction. That is, the sub-partitions of the current block may be derived by being divided in the vertical direction or may be derived by being divided in the horizontal direction. For example, the MPM list may be derived differently according to the split direction as described above.

For example, the sub-partitions of the current block may include a first sub-partition and a second sub-partition. Alternatively, the sub-partitions of the current block may include a first sub-partition, a second sub-partition, a third sub-partition, and a fourth sub-partition. Here, the number of sub-partitions may be determined based on the size of the current block.

For example, when the current block is divided into a first sub-partition and a second sub-partition, a prediction sample of the first sub-partition may be generated based on the intra prediction mode and neighboring samples of the first sub-partition, a prediction sample of the second sub-partition may be generated based on the intra prediction mode and the prediction sample of the first sub-partition. That is, the prediction sample of the first sub-partition may be generated based on the left neighboring sample and/or the top neighboring sample of the first sub-partition according to the intra prediction mode. Alternatively, a reference sample of the first sub-partition may be derived based on the left neighboring sample and/or the top neighboring sample of the first sub-partition according to the intra prediction mode, and the prediction sample of the first sub-partition may be generated based on the derived reference sample. A reference sample of the second sub-partition may be derived based on the left neighboring sample and/or the top neighboring sample of the second sub-partition according to the intra prediction mode, and a prediction sample of the second sub-partition may be generated based on the derived reference sample. Here, the prediction sample of the first sub-partition may be used as a neighboring sample of the second sub-partition. Alternatively, it may be derived as a reference sample of the second sub-partition. Here, the intra prediction mode of the second sub-partition may be the same as the intra prediction mode of the first sub-partition.

Alternatively, the decoding apparatus may directly use the prediction sample as a reconstructed sample according to the prediction mode. Also, the decoding apparatus may generate a predicted block of the current block based on the prediction sample. Also, the decoding apparatus may generate a reconstructed sample by adding a residual sample to the prediction sample. When there is a residual sample for the current block, the decoding apparatus may obtain information on the residual for the current block from the bitstream. The information on the residual may include transform coefficients on the residual sample. The decoding apparatus may derive the residual sample (or residual sample array) for the current block based on the residual information. The decoding apparatus may generate a reconstructed sample based on the prediction sample and the residual sample, and may derive a reconstructed block or a reconstructed picture based on the reconstructed sample. Thereafter, as described above, the decoding apparatus may apply an in-loop filtering procedure such as deblocking filtering and/or SAO procedure to the reconstructed picture in order to improve subjective/objective picture quality, if necessary.

In the above embodiment, the methods are described based on a flowchart as a series of steps or blocks, but this document is not limited to the order of the steps, and some steps may occur in a different order or concurrently with other steps as described above. In addition, those skilled in the art will understand that the steps shown in the flowchart are not exclusive and that other steps may be included or that one or more steps of the flowchart may be deleted without affecting the scope of this document.

The method according to this document described above may be implemented in the form of software, and the encoding apparatus and/or decoding apparatus according to this document may be included in, for example, a TV, a computer, a smart phone, a set-top box, a display device that performs image processing.

When the embodiments of the present document are implemented in software, the above-described method may be implemented by modules (processes, functions, and so on) that perform the functions described above. Such modules may be stored in memory and executed by a processor. The memory may be inside or outside the processor, and the memory may be connected to the processor using various well known means. The processor may include an application-specific integrated circuit (ASIC), other chipsets, a logic circuit, and/or a data processing device. The memory may include a read-only memory (ROM), a random access memory (RAM), a flash memory, a memory card, a storage medium, and/or other storage devices.

Figure 12:
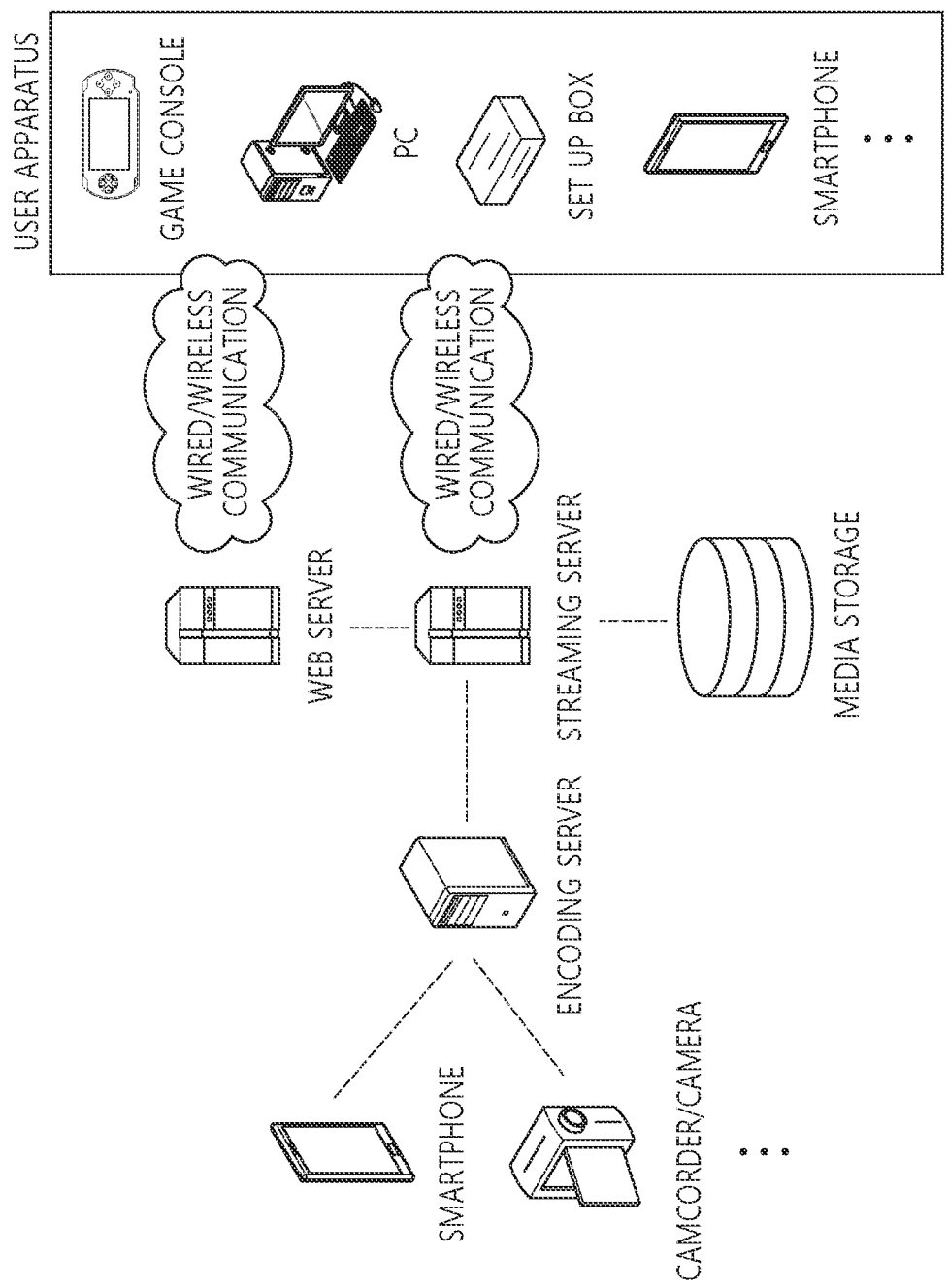
FIG. 12 is a diagram illustrating a structure of a content streaming system.

FIG. 12 is a diagram illustrating a structure of a content streaming system.

That is, the exemplary embodiments described in the present document may be performed by being implemented on a processor, a microprocessor, a controller, or a chip. For example, the functional units illustrated in each drawing may be performed by being implemented on a computer, a processor, a microprocessor, a controller, or a chip.

Further, the decoding apparatus and the encoding apparatus to which the present document is applied may be included in a multimedia broadcast transceiver, a mobile communication terminal, a home cinema video device, a digital cinema video device, a surveillance camera, a video chat device, a real-time communication device such as video communication, a mobile streaming device, a storage medium, a camcorder, a Video on Demand (VOD) service provider, an Over the top (OTT) video device, an Internet streaming service provider, a three-dimensional (3D) video device, a video call video device, a medical video device, or the like, and used for processing video signals or data signals. For example, the Over the top (OTT) video device may include a game console, a Blue-ray player, an Internet access TV, a home theater system, a smartphone, a tablet PC, a digital video recorder (DVR), and the like.

Further, the processing method to which the present document is applied may be produced in the form of a program executed by a computer, and stored in a computer-readable recording medium. The multimedia data having the data structure according to the present document may also be stored in the computer-readable recording medium. The computer-readable recording medium includes all kinds of storage devices and distribution storage devices in which the computer-readable data are stored. The computer-readable recording medium may include, for example, a Blue-ray disc (BD), a universal serial bus (USB), a ROM, a PROM, an EPROM, an EEPROM, a RAM, a CD-ROM, a magnetic tape, a floppy disc, and an optical data storage device. Further, the computer-readable recording medium includes a media implemented in the form of a carrier (e.g., transmission through the Internet). Further, the bitstream generated by the encoding method may be stored in the computer-readable recording medium or transmitted through a wired/wireless communication network. Further, the exemplary embodiment of the present document may be implemented by a computer program product by program codes, and the program codes may be performed by the computer according to the exemplary embodiment of the present document. The program codes may be stored on the computer-readable carrier.

Further, the content streaming system to which the present document is applied may largely include an encoding server, a streaming server, a web server, a media storage, a user device, and a multimedia input device.

The encoding server serves to compress the content input from the multimedia input devices such as a smartphone, a camera, and a camcorder into the digital data to generate a bitstream and transmit the bitstream to the streaming server. As another example, if the multimedia input devices such as a smartphone, a camera, and a camcorder directly generate the bitstream, the encoding server may be omitted. The bitstream may be generated by the encoding method to which the present document is applied or the bitstream generation method, and the streaming server may temporarily store the bitstream in the process of transmitting or receiving the bitstream.

The streaming server serves to transmit the multimedia data to the user device based on the user request through the web server, and the web server serves as a medium which informs the user of what services are available. When the user requests the desired service to the web server, the web server delivers the user's request to the streaming server, and the streaming server transmits the multimedia data to the user. At this time, the content streaming system may include a separate control server, and in this case, the control server serves to control commands/responses between the devices within the content streaming system.

The streaming server may receive the contents from the media storage and/or the encoding server. For example, when receiving the contents from the encoding server, the streaming server may receive the contents in real time. In this case, to provide the smooth streaming service, the streaming server may store the bitstream for a predetermined time.

As an example of the user device, there may be a portable phone, a smartphone, a laptop computer, a digital broadcast terminal, a personal digital assistants (PDA), a portable multimedia player (PMP), a navigation device, a slate PC, a tablet PC, an ultrabook, a wearable device (e.g., a smartwatch, a smart glass, a head mounted display (HMD)), a digital TV, a desktop computer, a digital signage, or the like. The respective servers within the content streaming system may be operated by a distribution server, and in this case, the data received by each server may be distributed and processed.

What is claimed is:

1. An image decoding method performed by a decoding apparatus, the method comprising:

receiving image information including prediction mode information for a current block, and intra sub-partition (ISP) related information for the current block through a bitstream, wherein the ISP related information is received based on a size of the current block and a maximum transform block size; and decoding the current block based on the prediction mode information and the ISP related information, wherein the step of decoding the current block further comprises:

deriving an intra prediction mode of the current block based on the prediction mode information; and generating a prediction sample of the current block based on the intra prediction mode and the ISP related information, wherein the ISP related information includes information on whether ISP is applied to the current block and information on a split direction, wherein the ISP related information is received based on the following condition related to the size of the current block being satisfied, $$cbWidth <= MaxTbSizeY \ \&\& \ cbHeight <= MaxTbSizeY$$

wherein the cb Width represents a width of the current block, the cbHeight represents a height of the current block, and the MaxTbSizeY represents the maximum transform block size.

2. An image encoding method performed by an encoding apparatus, the method comprising:

deriving an intra prediction mode of a current block;

deriving intra sub-partitions (ISP) related information for the current block based on a size of the current block and a maximum transform block size;

generating a prediction sample of the current block based on the intra prediction mode and the ISP related information;

generating a residual sample based on the prediction sample; and encoding image information including prediction mode information on the intra prediction mode, the ISP related information and information on the residual sample, wherein the ISP related information includes information on whether ISP is applied to the current block and information on a split direction, wherein the ISP related information is received based on the following condition related to the size of the current block being satisfied, $$cbWidth <= MaxTbSizeY \ \&\& \ cbHeight <= MaxTbSizeY$$

wherein the cbWidth represents a width of the current block, the cbHeight represents a height of the current block, and the MaxTbSizeY represents the maximum transform block size.

3. A non-transitory computer readable storage medium storing a bitstream generated by the method of claim 2.

4. A transmission method of data for an image, the transmission method comprising:

obtaining a bitstream for the image, wherein the bitstream is generated based on deriving an intra prediction mode of a current block, deriving intra sub-partitions (ISP) related information for the current block based on a size of the current block and a maximum transform block size, generating a prediction sample of the current block based on the intra prediction mode and the ISP related information, generating a residual sample based on the prediction sample and encoding image information including prediction mode information on the intra prediction mode, the ISP related information and information on the residual sample; and
transmitting the data comprising the bitstream,
wherein the ISP related information includes information on whether ISP is applied to the current block and information on a split direction,
wherein the ISP related information is configured to be received based on the following condition related to the size of the current block being satisfied, $$cbWidth <= MaxTbSizeY \;\&\&\; cbHeight <= MaxTbSizeY$$

wherein the cb Width represents a width of the current block, the cbHeight represents a height of the current block, and the MaxTbSizeY represents the maximum transform block size.

\* \* \* \* \*